United States Patent Office 3,379,425
Patented Apr. 23, 1968

3,379,425
SCRAP METAL PREHEATER
David E. Dell'Agnese, Port Washington, Wis., and Townsend Tinker, Easton, Md., assignors to Modern Equipment Company, Port Washington, Wis., a corporation of Wisconsin
Filed Mar. 29, 1966, Ser. No. 538,391
2 Claims. (Cl. 263—17)

ABSTRACT OF THE DISCLOSURE

This invention relates to aligned upper and lower furnace compartments, which are a new innovation in a scrap metal preheater, with the hot gas inlet in the lower compartment only.

---

Figure 1:
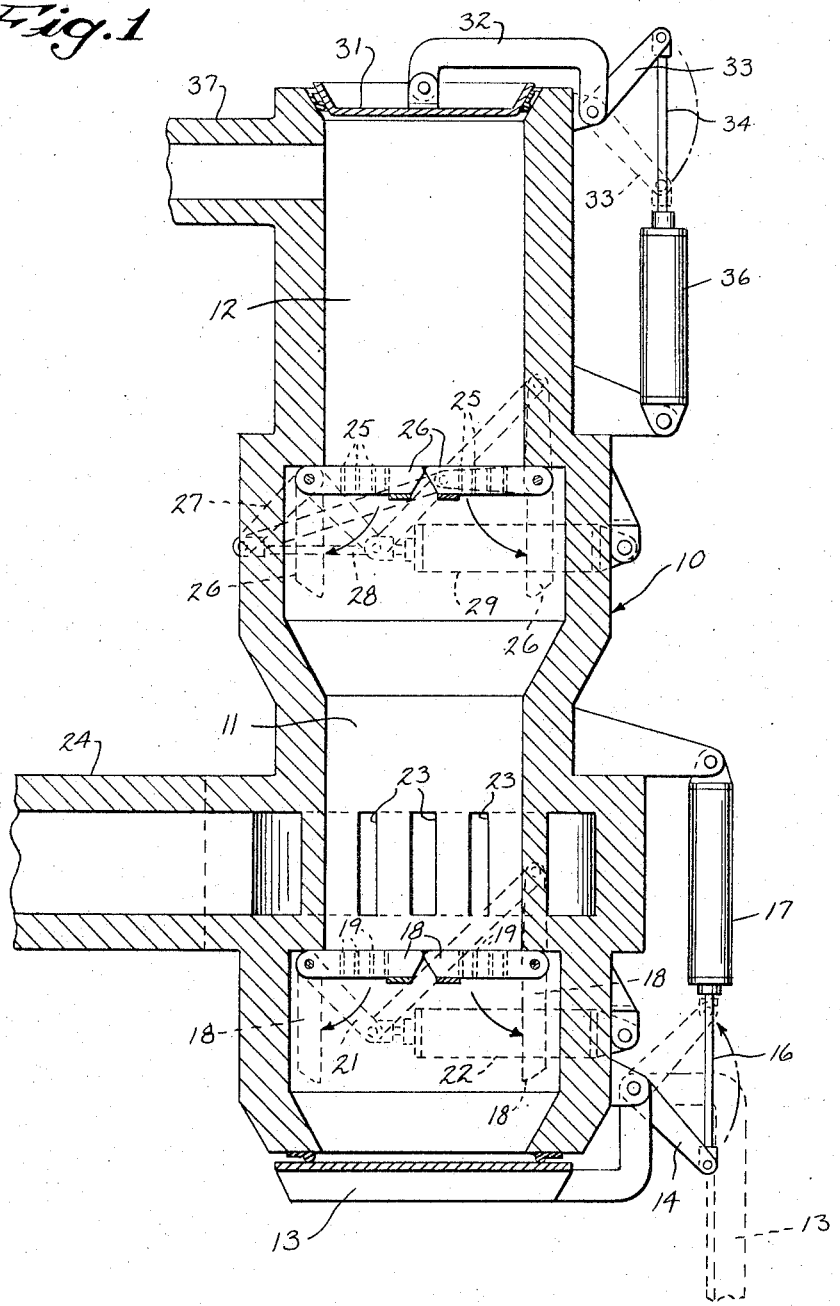

This invention relates to an improved scrap metal preheater, and more particularly to a novel and improved device for preheating a charge of metal scrap prior to its introduction into an electric melting furnace.

In the melting of iron or other metal scrap in an electric furnace it is advantageous to preheat said scrap by means of a preheater using low-cost gas in order to speed and facilitate the job of said electric furnace which is relatively expensive to operate. By such preheating it is possible to obtain greatly increased production without enlarging the capacity of the electric furnace. Moreover, by pre-heating the metal scrap before it is introduced into the furnace the moisture content of said scrap is removed, thus minimizing the possibility of an explosion and, additionally, many of the impurities in the scrap are melted out. Unfortunately, however, conventional gas preheaters have several shortcomings and are not entirely satisfactory for their intended purpose.

One series shortcoming of conventional gas preheaters is that they employ an excessive amount of air in the burners, in addition to that required for combustion, and the oxygen in said excess air tends to oxidize the scrap metal and results in undesirable rust or scale on the charge. In addition, the present practice is to preheat the scrap metal to about 1800° F. prior to its introduction into the furnace, where it is melted at above 2400°, but with the preheaters presently available it has been found that the temperature of the upper portion of the charge, which is remote from the burners, may be only 1600° while the lower portion of said charge may reach 2000° or above.

A further disadvantage of conventional preheaters is that they are slow and inefficient in operation. With such conventional devices it ordinarily takes an hour and a half or two hours to preheat a charge of scrap metal, and in order to maintain a continuous operating cycle it is necessary to employ a large number of charge buckets and preheaters, which is not only inconvenient but is expensive.

With the above considerations in mind, one of the principal objects of the present invention is to provide a novel scrap preheater which is designed to simultaneously hold two or more charges of scrap metal, one above the other, so that while the lower charge is being preheated to the optimum desired temperature the hot gases passing upwardly therethrough also begin preheating the charge positioned thereabove. The result is than when said lower charge is deposited in the melting furnace and the upper charge descends to its position in the multi-stage preheater said upper charge will have already been partially heated, thereby reducing the time required to preheat said charge to the desired temperature, and greatly increasing the speed and efficiency of the melting operation.

A further important object of the invention is to provide a novel scrap metal preheater which is designed to recirculate the relatively inert, exhausted combustion gases to temper the burner, in lieu of using excess air as in conventional preheaters, thereby minimizing oxidation of the scrap metal and producing charges which are relatively free of rust and corrosion.

A further object of the present invention is to provide an improved scrap metal preheater wherein the entire charge is more uniformly and thoroughly heated, and wherein said charge can be heated to a higher temperature more closely approaching the melting point of the metal than is possible with conventional preheaters.

Still further objects of the present invention are to provide an improved scrap metal preheater which is relatively inexpensive in design and construction, which is simple and reliable in operation, and which is otherwise particularly well adapted for its intended purposes.

With the above and other objects in view, which other objects and advantages will become apparent hereinafter, the invention comprises the improved scrap metal preheater illustrated and described in the following specification and also any and all modifications or variations thereof as may come within the spirit of said invention, and within the scope of the appended claims.

Figure 2:
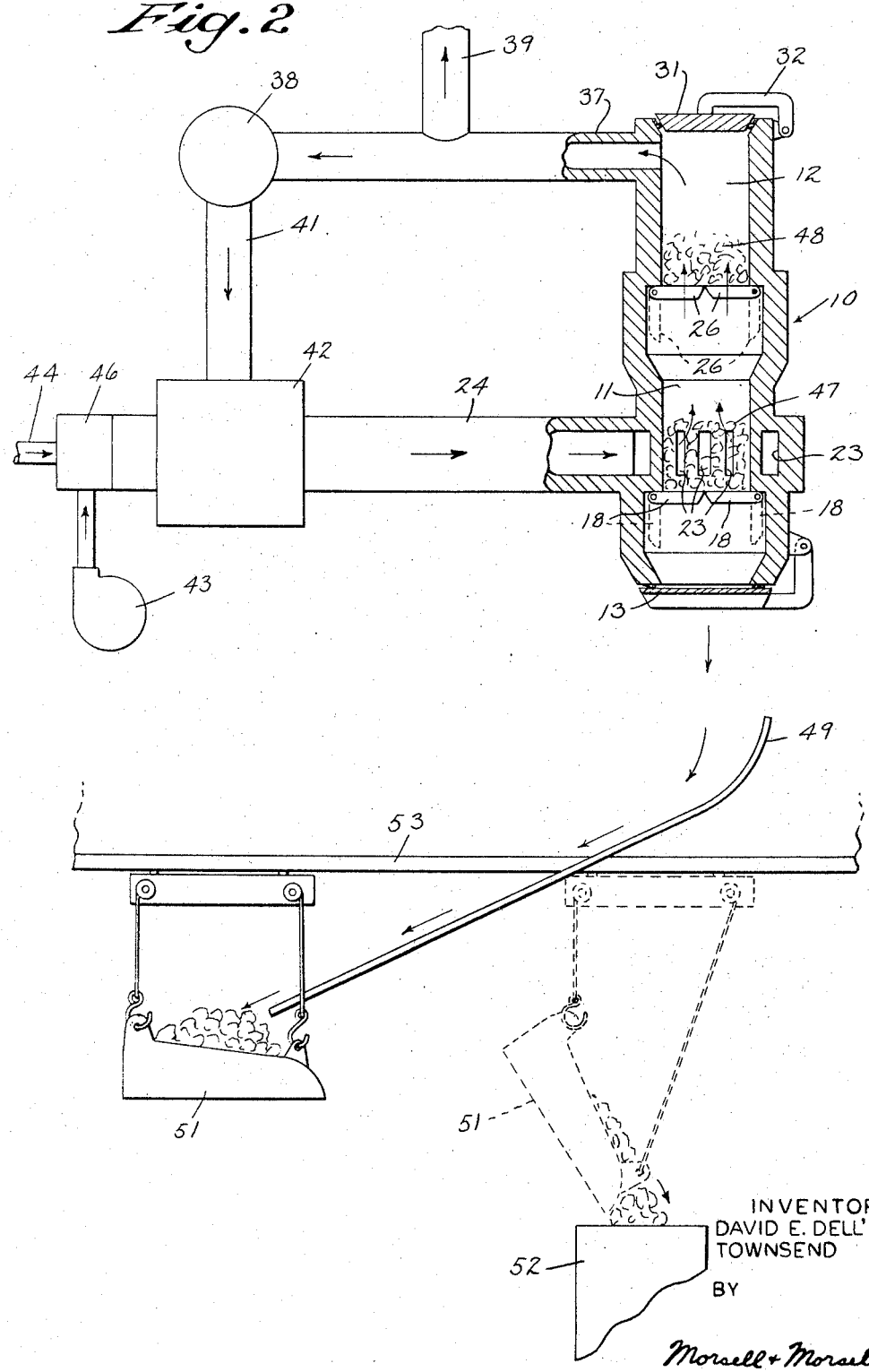

In the accompanying drawing, wherein there is illustrated one preferred embodiment of the invention, and wherein the same reference numerals designate the same parts in both of the views:

FIG. 1 is a vertical sectional view of the preheat furnace utilized in the present invention; and FIG. 2 is a diagrammatic view of the complete preheater system, with the novel charge-containing furnace shown in section.

Referring now more particularly to FIG. 1 of the drawings, illustrated therein is the novel charge container or preheat furnace employed in the present invention and which is designated generally by the numeral 10. Said furnace is generally cylindrical in form and includes an upper section or compartment 12 and lower compartment 11, the lower end of said furnace having an opening therein and a hinged gas seal cover 13 which is pivotally associated with a hydraulic cylinder 17, extensible ram 16, and lever arm 14 which permits the controlled opening and closing of said cover. In lieu of said hydraulic members, and in lieu of the hydraulic gate and cover-actuating members hereinafter described, it is to be understood that mechanical or other suitable operating means could be employed, and the invention is by no means to be limited in this respect.

Intermediate the height of said furnace lower compartment 11 are a plurality of large, annularly-spaced gas inlet openings 23 which communicate with a burner supply pipe 24, the function of which will be hereinafter described, and mounted within the interior of said lower compartment immediately below said gas openings 23 are a pair of hinged, clam-shell type floor elements or gates 18. Said gates are pivotally associated with a hydraulic cylinder and ram unit 22 and levers 21 which permit the same to be swung downwardly to the open position illustrated in broken lines.

The upper section or compartment 12 of the preheat furnace 10 is generally similar in design to the lower compartment 11 and is provided with a pair of gates 26 having a multiplicity of openings 25 through which hot combustion gases may freely pass, as will be described, and which gates are pivotally associated with a hydraulic cylinder 29 and levers 28 permitting the same to be swung to the open, broken-line position shown. The upper portion of said compartment 12 has an exhaust gas duct 37 communicating therewith and a hinged sealing cover 31 is pivotally associated with a hydraulic cylinder 36, ram 34, and a lever 33 to permit the controlled opening and closing of said top cover. It will be noted that sharp wall angles and protuberances have been avoided in the interior of the preheat furnace in order to eliminate the possibility of scrap metal wedging or catching therein.

Referring now to FIG. 2 of the drawing, which is a simplified diagrammatic showing, it will be seen that the aforementioned gas exhaust duct 37 communicating with the upper end of the furnace 10 leads to a recirculation blower 38, and intermediate the length of said duct 37 is a discharge stack 39 having a suitable check damper (not shown), said stack being designed to discharge a predetermined portion of the exhausted gases of combustion during operation, as will be described. Said recirculation blower 38 is provided with a conduit 41 which leads to a burner 46 and combustion chamber 42, there being a blower 43 associated therewith and a supply pipe 44 leading from a suitable source of natural gas or other inexpensive fuel. Said combustion burner communicates with the aforementioned conduit 24 leading into the lower portion of the preheat furnace 10.

In the use of the present invention, when it is desired to preheat a charge of iron or other metal scrap, the top cover 31 of the furnace 10 is swung to an open position and a first charge of scrap metal is deposited therein. During the initial loading operation the gates 26 in the furnace upper compartment 12 are in their open, broken-line position to permit the charge to fall downwardly into the lower compartment 11, and the gates 18 in said lower compartment are closed. After the first charge of scrap metal has been deposited in the furnace, which charge is designated by the numeral 47 in FIG. 2, the upper compartment gates 26 are pivoted to their closed position and a second charge of scrap metal is introduced through the open top of said furnace, said second charge 48 (FIG. 2) resting on said gates 26 and being positioned directly above the charge 47 in the lower compartment. The furnace top cover 31 is then closed and the unit is ready for operation. As will be hereinafter seen, the mounting of two charges in the preheat furnace in stacked relationship is one of the unique and advantageous features of the present invention.

The burner 46 is then actuated and the hot combustion gases are forced through the conduit 24 and into the lower portion of the furnace 10 through the annular openings 23, said hot gases flowing upwardly through the lower scrap charge 47 and functioning to heat the same. As hereinabove mentioned, in conventional preheaters the charge is heated to an average of about 1800° F., but the arrangement of the small capacity, nozzle-mixing burners in said prior units is such that the upper portion of the charge may be only 1600° while the lower portion is 2000° or above. In the present unit, however, a much greater mass of hot gases is continuously passed through the metal charge, and there is more uniform heating of the entire charge. The result is that said charge is not only heated faster but it can be preheated to a higher temperature more closely approaching the melting point of the metal, thus speeding and facilitating the job of the relatively-expensive electric furnace and reducing the cost of the melting operation.

As the hot combustion gases flow upwardly through the lower charge 47 of scrap metal the temperature of said gases is reduced as heat is extracted therefrom and transferred to the metal, of course, but as said gases reach the upper charge 48 they are still sufficiently hot to begin preheating said cold upper charge. When the gases pass completely through the upper charge 48 they are cooled still further and are drawn outwardly through the duct 37, a portion of said gases being directed through the exhaust stack 39. In accordance with the present invention, however, a predetermined proportion of said spent combustion gases bypass said exhaust stack and are directed by the recirculation blower 38 back into the combustion chamber 42 of the burner. In the combustion chamber said cooler exhaust gases are intermixed with and temper the hot combustion gases and reduce the temperature of the latter to a desired, usable level.

As hereinabove mentioned, in conventional scrap preheaters a quantity of air in excess of that required for combustion is introduced into the burner combustion chamber to be mixed with and temper the combustion gases, and it has been found that the oxygen in said excess air tends to oxidize the scrap metal charge, thus producing undesirable rust and scale. With the present invention, however, the recirculated, spent exhaust gases are inert, of course, said gases consisting primarily of nitrogen and carbon dioxide, and the use of said inert gases in lieu of air to lower the temperature of the combustion gases reduces the oxidation of the charge to a minimum, and results in charges of superior quality. The elimination of rust and corrosion is further promoted by the relatively short preheating period required with the present invention, as will be described, and is one of the principal advantageous features of said invention.

When the lower scrap charge 47 has been heated to the optimum desired temperature the burner 46 is temporarily shut off and the gates 18 in the furnace lower compartment 11 and the bottom cover 13 are swung to their open positions thus allowing said fully-heated charge to drop onto a trough 49 (FIG. 2) which is designed to direct said preheated scrap into a suitable crane or transport bucket 51. Said bucket then delivers the charge to the electric melting furnace 52 and deposits the same therein, as is shown in broken lines in FIG. 2.

After the preheated lower charge has been evacuated from the preheat furnace 10 as described, the lower compartment gates 18 and bottom cover 13 are again swung upwardly to their closed positions, and the gates 26 of the upper compartment 12 are opened, thus allowing the upper charge 48 to cascade or fall downwardly into the lower compartment 11, said upper charge having already been partially preheated during the preheating of the first charge, as described. Said upper gates 26 are then returned to their closed position and a new cold charge is deposited in the furnace upper compartment 12. The burner 46 is then reactivated to complete the preheating of the lower charge while the rising combustion gases simultaneously flow through the cold upper charge to begin preheating the same, and the entire cycle is repeated.

It has been found that with the novel design of the multi-stage preheat furnace 10 characterizing the present invention, wherein one scrap charge is partially preheated at the same time another charge is being heated to the optimum temperature, a supply of fully preheated scrap metal is ready for delivery to the electric melting furnace every seven or eight minutes, in lieu of the hour and a half or two hour period required with inefficient conventional preheaters.

In the preferred form of the present invention the opening and closing of the furnace gates and cover members, and the discharge of the preheated scrap from said furnace, are automatically timed and synchronized, thus eliminating the necessity for a human operator and automatically providing fully preheated charges at regular predetermined intervals. In addition, in lieu of a preheat furnace having two compartments, as in the illustrated form of the invention, it is contemplated that it might be advantageous in some installations to employ three or more stacked charge-holding compartments, and the invention is not to be limited in this respect.

From the foregoing detailed description it will be seen that the present invention provides a new and improved scrap metal preheater having several important advantages over the preheaters heretofore used. With the present invention two or more charges of scrap metal can be simultaneously carried in the preheater, one above the other, so that as the lower charge is being preheated to the optimum desired temperature the rising gases of combustion also function to begin preheating the charge or charges thereabove. The result is that when the lower scrap charge is deposited in the electric melting furnace and the charge thereabove descends to its position in the preheater the latter charge will have already been partially preheated, thereby greatly reducing the time required to fully preheat said charge.

Another important advantage obtained with the present invention is that by recirculating the relatively inert exhaust gases to temper the burner, in lieu of using excess air as in conventional preheaters, there is a minimum of oxidation of the scrap metal charge and said charge is relatively free of rust or scale. Moreover, with the present invention because the entire scrap charge is heated more uniformly it has been found that it can be heated to a higher temperature more closely approaching the melting point of the metal than in conventional preheaters, which further increases the efficiency and economy of the melting operation.

It is to be understood that while a preferred embodiment of the present invention has been illustrated and described herein, numerous modifications of said structure are possible and it is intended to cover herein not only the illustrated form of the invention but also any and all variations or modifications thereof as may come within the spirit of said invention, and within the scope of the following claims.

What we claim is:

1. A scrap metal preheater, comprising: a furnace having vertically-aligned upper and lower compartments and having top and bottom openings; means for opening and closing said top and bottom openings; annularly-spaced gas inlet means in said lower furnace compartment only; pivotal bottom gate members in said lower furnace compartment adapted to support a scrap metal charge, said gate members being pivotal from a substantially horizontal charge-supporting position to a lowered, open position permitting a charge to fall therefrom through said furnace bottom opening; pivotal bottom gate members in said furnace upper compartment adapted to support a second scrap metal charge in alignment above a scrap metal charge in said lower compartment, said upper compartment gate members having a plurality of openings permitting hot gases to pass upwardly therethrough, and said upper compartment gate members being pivotal from a substantially horizontal charge-supporting position to a lowered, open position permitting a charge to fall therefrom into said furnace lower compartment; means for introducing hot combustion gases through said inlet means into said lower furnace compartment to cause said gases to pass upwardly through and fully preheat a scrap metal charge supported therein, said upwardly traveling gases passing through the openings in said upper compartment gate members to partially preheat a scrap metal charge supported thereon; a gas exhaust opening communicating with said furnace upper compartment; means for opening said lower compartment bottom gates to discharge a fully preheated scrap metal charge from said furnace lower compartment; means for closing said lower compartment gate members after a preheated scrap metal charge has been discharged; means operable when said lower compartment gates are closed for opening said upper compartment gates to cause a partially preheated scrap metal charge supported thereon to fall into said lower furnace compartment; means for closing said upper compartment gates; and means operable when said upper compartment gates are closed for introducing a new charge of scrap metal through the furnace top opening into said upper furnace compartment.

2. The scrap metal preheater recited in claim 1, and having: a recirculation blower associated with said furnace exhaust opening adapted to draw spent combustion gases therethrough; a gas burner; a combustion chamber associated with said burner; means connecting said recirculation blower to said combustion chamber, said recirculation blower being adapted to direct spent exhaust gases drawn from the furnace into said combustion chamber to temper combustion gases therein; and means for directing said tempered gases from said combustion chamber into the furnace through said gas inlet means.

References Cited

UNITED STATES PATENTS

| | | | |
|---|---|---|---|
| 471,672 | 3/1892 | Leede | 263—31 |
| 794,837 | 7/1905 | Anker et al. | 263—31 |
| 3,163,520 | 12/1964 | Collin et al. | 13—33 X |
| 3,172,648 | 3/1965 | Brichard | 263—31 |

JOHN J. CAMBY, *Acting Primary Examiner.*